(12) United States Patent
Yamamoto

(10) Patent No.: US 9,580,132 B2
(45) Date of Patent: Feb. 28, 2017

(54) SCOOTER-TYPE VEHICLE

(71) Applicant: HONDA MOTOR CO., LTD., Tokyo (JP)

(72) Inventor: Kanta Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/841,854

(22) Filed: Sep. 1, 2015

(65) Prior Publication Data

US 2016/0090143 A1    Mar. 31, 2016

(30) Foreign Application Priority Data

Sep. 25, 2014    (JP) .................................. 2014-195638

(51) Int. Cl.
| | | |
|---|---|---|
| *B60R 5/00* | (2006.01) | |
| *B62K 19/46* | (2006.01) | |
| *B62K 3/02* | (2006.01) | |
| *B62K 21/02* | (2006.01) | |

(52) U.S. Cl.
CPC ................ *B62K 19/46* (2013.01); *B62K 3/02* (2013.01); *B62K 21/02* (2013.01)

(58) Field of Classification Search
CPC ........... B62K 19/46; B62K 3/02; B62K 21/02
See application file for complete search history.

(56) References Cited

U.S. PATENT DOCUMENTS

| | | | | |
|---|---|---|---|---|
| 8,888,162 | B2* | 11/2014 | Hughes ................... | B62J 9/005 296/37.1 |
| 2012/0199409 | A1* | 8/2012 | Nakamura .............. | B60K 1/04 180/220 |
| 2014/0110961 | A1* | 4/2014 | Hughes ................... | B62J 9/005 296/37.1 |

FOREIGN PATENT DOCUMENTS

JP    2013-193646    3/2013

* cited by examiner

*Primary Examiner* — Lori L Lyjak
(74) *Attorney, Agent, or Firm* — Rankin, Hill & Clark LLP

(57) ABSTRACT

A scooter-type vehicle having a storage portion that is formed so as to open in a leg shield, and that is covered by a lid member. An upwardly open storage box is formed on a back surface of the lid member, and the storage box is openably and closably mounted on a lower portion of an opening of the storage portion via a hinge. An axis of the hinge is obliquely arranged such that, as viewed in a plan view, an outer side in the vehicle width direction of the axis of the hinge is positioned more on a front side in a longitudinal direction of the vehicle than a center side of the axis of the hinge in the vehicle width direction. The lid member moves so as to fall obliquely in the rearward and outward direction so that the lid member is opened while avoiding a rider's leg.

6 Claims, 8 Drawing Sheets

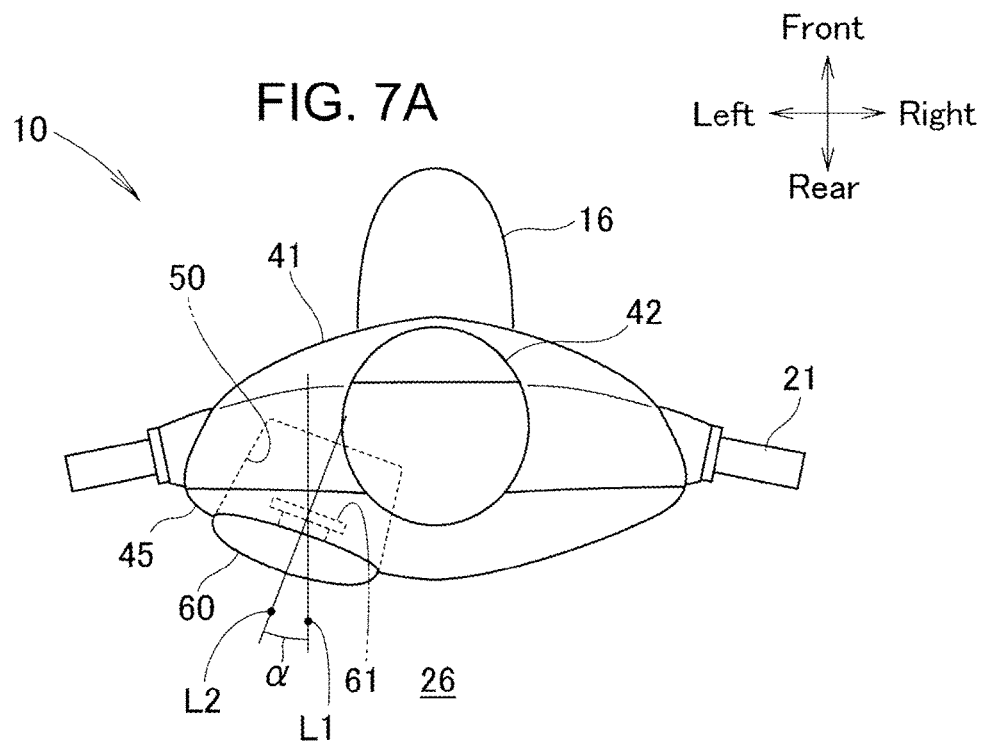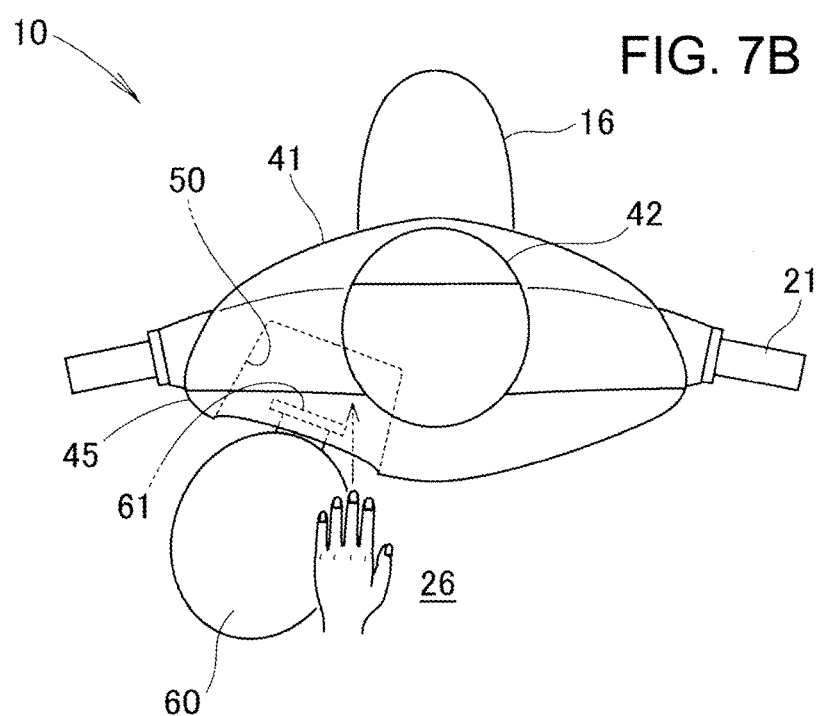

SCOOTER-TYPE VEHICLE

BACKGROUND OF THE INVENTION

Field of the Invention

The present invention relates to the improvement of a scooter-type vehicle provided with a storage portion formed in the inside of a leg shield.

Description of Related Art

As a scooter-type vehicle, there is known a vehicle where a storage portion is formed in the inside of a cover arranged in a front portion of the vehicle, and the storage portion is closed by a lid member (see JP-A-2013-193646 (FIG. 4 and FIG. 5), for example).

As shown in FIG. 4 of JP-A-2013-193646, in a scooter-type vehicle (1) (numerals in parentheses indicating symbols described in JP-A-2013-193646, the same indication being applicable hereinafter), a front portion of a vehicle body is covered by a front cover (130). A storage portion (132) having an opening portion (142) on a rider's side is formed in the inside of the front cover (130). A lid member (153) is openably and closably formed on a wall surface of the storage portion (132) on the rider's side by means of a hinge (148). By closing the lid member (153), the falling out of an article can be prevented. The hinge (148) is mounted on a lower portion of the lid member (153), and the lid member (153) is opened by pulling an upper portion of the lid member (153).

However, the lid member (153) is opened directly toward the rider and hence, at the time of opening the lid member (153), the lid member (153) hits a leg of the rider or a space of a foot rest portion is narrowed due to the lid member (153). In view of the above, there has been a demand for a scooter-type vehicle having more favorable usability where a space of a foot rest portion is ensured when the storage portion is used by opening the lid member of the storage portion.

SUMMARY OF THE INVENTION

It is an object of the invention to provide a scooter-type vehicle having more favorable usability where a space of a foot rest portion is ensured when a storage portion is used by opening a lid member of the storage portion.

In accordance with the present invention, a scooter-type vehicle includes: a handle bar for steering a front wheel; a seat that is disposed behind the handle bar and on which an occupant is seated; a flat floor that is disposed between the seat and the handle bar and on which feet of the occupant are placed; a leg shield that is mounted on a front portion of the flat floor and extends upward; and a storage portion that is formed on the leg shield on a seat side and stores an article therein. The storage portion is formed so as to open in the leg shield, and is covered by a lid member. The lid member is configured such that a storage box, which opens upwardly, is formed on a back surface thereof. The lid member is openably and closably mounted on a lower portion of an opening of the storage portion via a hinge. An axis of the hinge is obliquely arranged such that, as viewed in a plan view, an outer side of the axis of the hinge in the vehicle width direction is positioned more on a front side in a longitudinal direction of the vehicle than a center side of the axis of the hinge in the vehicle width direction.

Accordingly, when the lid member is opened, the lid member moves so as to fall obliquely in the rearward and outward direction so that the lid member is opened while avoiding a rider's leg. As a result, when the storage portion is used by opening the lid member of the storage portion, articles can be easily put into and taken out from the storage portion while ensuring a space of a foot rest portion and hence, the storage portion having more favorable usability can be acquired.

In further accordance with the present invention, the storage portion includes: a deep end wall that is formed so as to extend in the vertical direction on a deep end side of an opening formed in the leg shield; and a power supply socket that is disposed at an upper portion of the deep end wall on an inner side in the vehicle width direction and supplies electricity. The power supply socket is arranged so as to be observable by a naked eye from a rear side in the longitudinal direction of the vehicle when the lid member is opened.

The lid member is obliquely opened and hence, when the lid member is opened in the rearward direction in the longitudinal direction of the vehicle and in the outward direction in the vehicle width direction, the power supply socket is observable by a naked eye as viewed from a rear side in the longitudinal direction of the vehicle. That is, there is nothing blocking the rider's viewing of the power supply socket disposed behind the power supply socket in the longitudinal direction of the vehicle and hence, a rider can easily perform an operation at the time of using the power supply socket.

In further accordance with the present invention, the storage box includes: a projecting portion that is disposed outside the storage box and extends frontwardly in the longitudinal direction of the vehicle; and an engaging portion that is formed on a distal end portion of the projecting portion, and makes the storage box engage with the storage portion. The storage portion has a side wall that extends frontwardly in the longitudinal direction of the vehicle from the opening formed in the leg shield and in which a stopper hole is formed. The engaging portion is engaged with the stopper hole when the lid member is opened.

The storage box is stored in the storage portion and, when the lid member is opened, the engaging portion formed on the storage box is engaged with the stopper hole formed in the side wall of the storage portion. Accordingly, the opening of the lid member can be restricted so that it becomes possible to prevent an article from falling out when the lid member is opened.

In further accordance with the present invention, a corrugated portion where a crest shape and a valley shape are continuously formed in the longitudinal direction of the vehicle is formed on the side wall, and the engaging portion is brought into slide contact with the corrugated portion when the lid member is opened or closed.

At the time of opening or closing the lid member, the engaging portion is brought into slide contact with the corrugated portion. Accordingly, resistance is generated when the lid member is opened and hence, sudden opening of the lid member can be prevented whereby the lid member can be opened or closed smoothly.

BRIEF DESCRIPTION OF THE DRAWINGS

These and further features of the invention will be apparent with reference to the following description and drawings, wherein:

FIGS. 7A and 7B are operational views of the scooter-type vehicle; and,

DETAILED DESCRIPTION OF THE INVENTION

The embodiment of the invention is explained hereinafter by reference to attached drawings. The drawings are viewed in accordance with the direction of symbols. Directions such as "frontward (Fr)", "rearward (Rr)", "leftward (L)", "rightward (R)", "upward (Up)" and "downward (Down)" are directions as viewed from a rider.

Firstly, the embodiment of the invention is explained based on the drawings.

Figure 1:
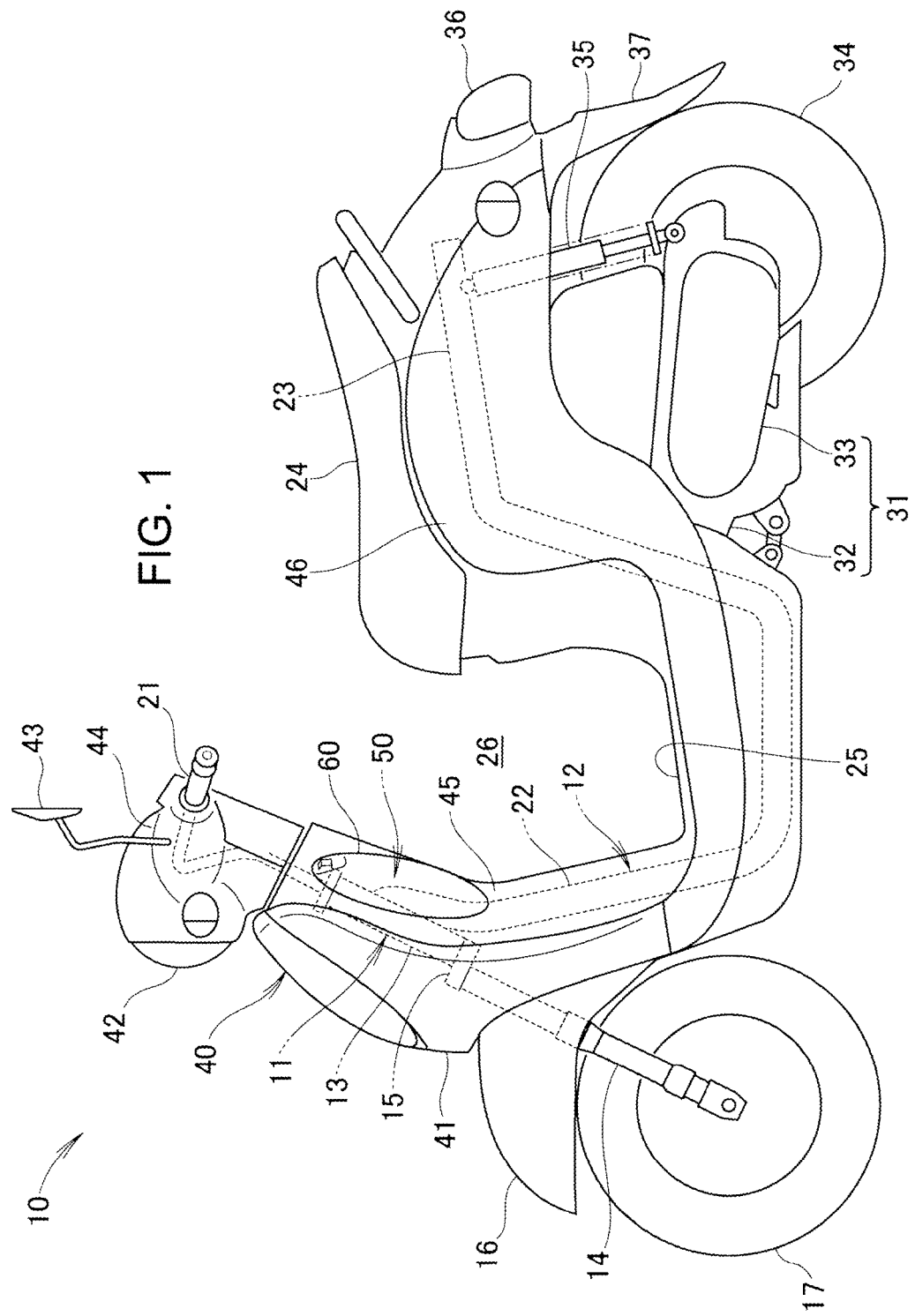
FIG. 1 is a left side view of a scooter-type vehicle according to the invention.
Figure 2:
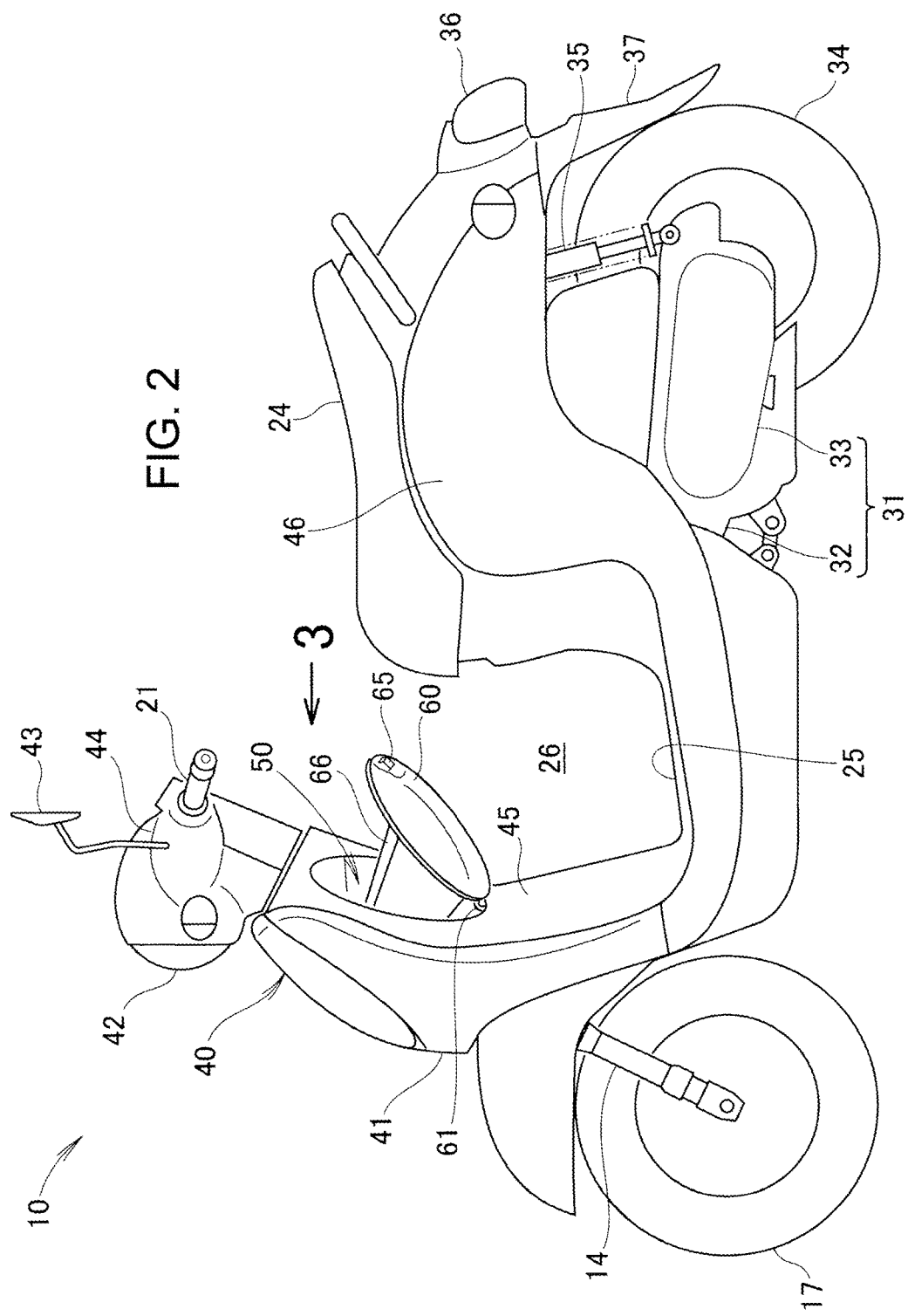
FIG. 2 is a left side view of the scooter-type vehicle in a state where a lid member is opened.

As shown in FIG. 1 and FIG. 2, a vehicle 10 is a scooter-type vehicle. The vehicle 10 includes: a vehicle body frame 12 that forms a vehicle body 11; a head pipe 13 that forms a front portion of the vehicle body frame 12; a bottom bridge 15 that is mounted on a lower end of the head pipe 13 and supports upper ends of left and right front forks 14; and a front wheel 17 that is supported on lower ends of the front forks 14, and is covered by a front fender 16 from above.

The vehicle 10 also includes a vehicle body cover 40 that covers the vehicle body 11. A front portion of the vehicle 10 includes: a front cover 41 that is mounted on the head pipe 13 by way of a front cover stay and covers a front portion of the vehicle body 11; a lamp 42 that is mounted on the front cover 41 and emits light toward an area in front of the vehicle; a handle bar 21 that is rotatably supported on an upper portion of the head pipe 13 and steers the front wheel 17; and mirrors 43 that are mounted on the front cover 41 in the vicinity of the handle bar 21.

The vehicle body frame 12 includes: a down frame 22 that extends rearwardly and downwardly from the head pipe 13; a seat rail 23 that extends rearwardly and upwardly from a rear end portion of the down frame 22; a seat 24 that is mounted on the seat rail 23 behind the handle bar 21 and on which an occupant is seated; and a flat floor 25 that is disposed between the seat 24 and the handle bar 21 and on which the occupant places his feet.

A foot rest space portion 26 where legs of the occupant are positioned is formed between the seat 24, flat floor 25 and the front cover 41. The vehicle body frame 12 includes the down frame 22 that extends rearwardly and downwardly from the head pipe 13 and the flat floor 25 in the embodiment. However, the constitution of the vehicle body frame 12 is not limited to the above, and there is no problem for the vehicle body frame 12 to adopt the constitution of a so-called big scooter type which includes: a main frame that extends rearwardly and downwardly from the head pipe 13; a straddling portion that covers the main frame; and a flat floor.

A power unit 31 of a unit swing type engine is mounted on a rear portion of the down frame 22, and the power unit 31 is constituted of an engine 32 and a transmission 33. An output of the engine 32 is transmitted to a rear wheel 34 mounted on a rear portion of the power unit 31 through the transmission 33.

Further, a cushion unit 35 that absorbs an impact applied to the rear wheel 34 is arranged between the rear portion of the power unit 31 and the seat rail 23. A tail light 36 is disposed behind the seat rail 23, and a rear fender 37 that covers the rear wheel 34 from above and behind is arranged below the tail light 36.

The vehicle body cover 40 includes: a front cover 41 that covers at least a portion of the head pipe 13; a handle bar cover 44 that covers the handle bar 21; a leg shield 45 that is mounted on a front portion of the flat floor 25, extends upwardly, and covers a rear side of the down frame 22; and side covers 46 that are connected to the leg shield 45 and the front cover 41, and cover sides of a vehicle body in the vehicle width direction and a rear portion of the vehicle from the vehicle width direction.

A storage portion 50 in which articles are stored is formed on a seat 24 side of the leg shield 45. The storage portion 50 is formed so as to open in the leg shield 45, and is covered by an openable and closable lid member 60.

Figure 3:
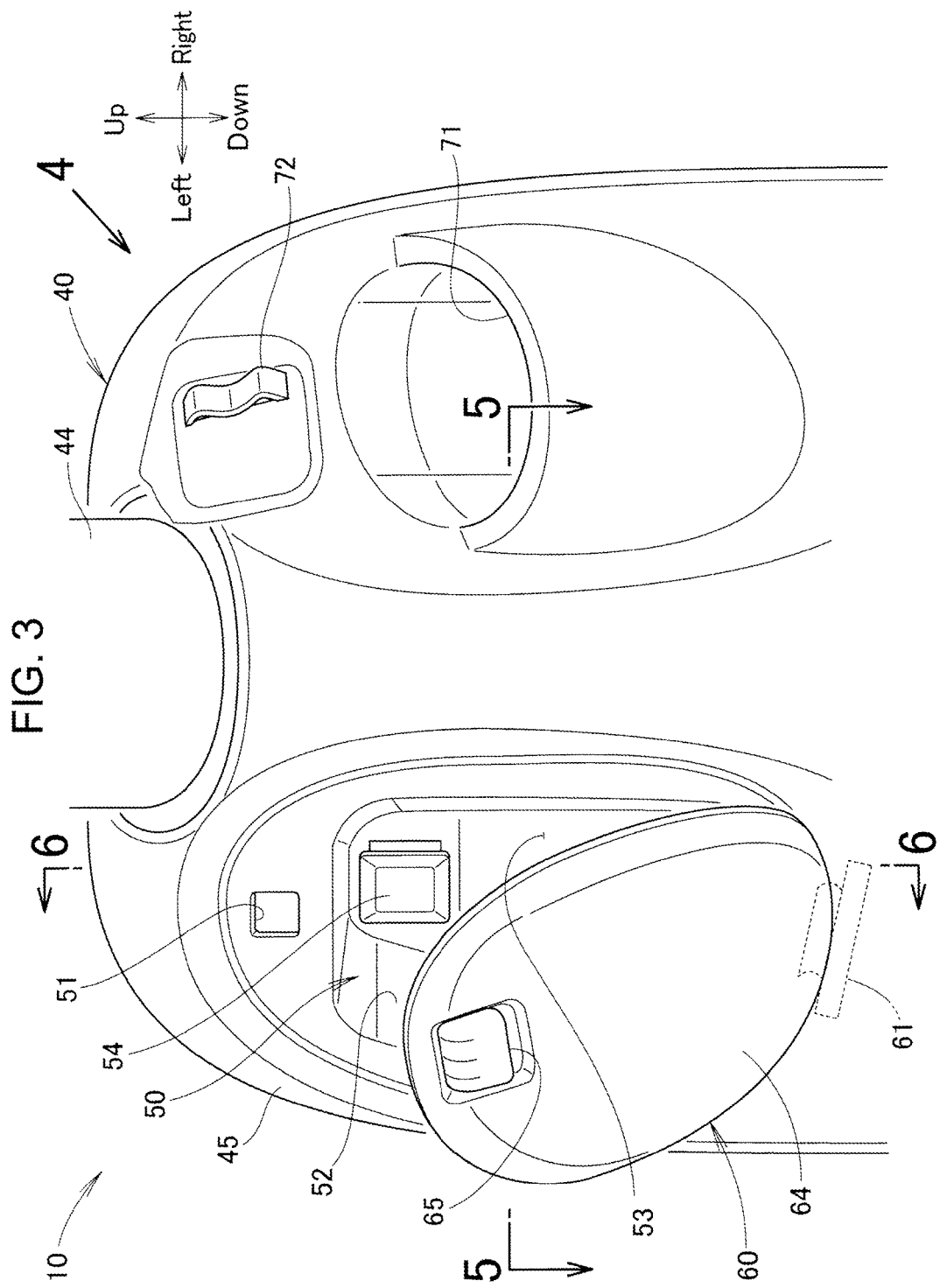
FIG. 3 is a view of the scooter-type vehicle shown in FIG. 2 as viewed in the direction indicated by an arrow 3.
Figure 4:
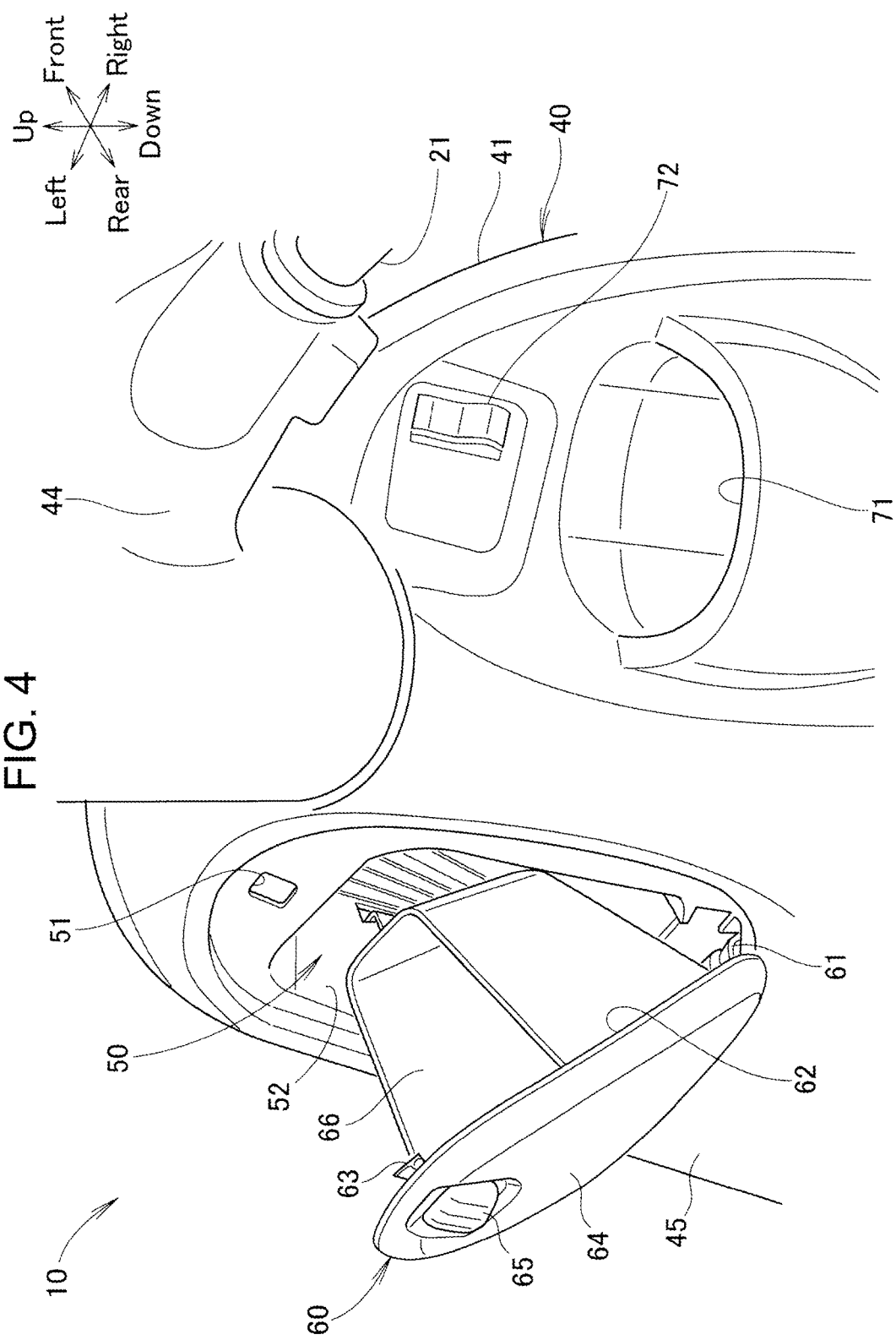
FIG. 4 is a view of the scooter-type vehicle shown in FIG. 3 as viewed in the direction indicated by an arrow 4.

As shown in FIG. 3 and FIG. 4, the storage portion 50 is formed on the leg shield 45 on a left side in the vehicle width direction. The lid member 60 is openably and closably mounted on a lower portion of an opening of the storage portion 50 by means of a hinge 61. A pawl 63 is formed on a back surface 62 of an upper portion of the lid member 60. By making the pawl 63 engage with a pawl engaging hole 51 formed in an upper portion of the storage portion 50, the lid member 60 is held in a closed state. A tab 65 is formed on a front surface 64 of an upper portion of the lid member 60. When a rider pulls the tab 65 with his fingers, the pawl 63 is removed from the pawl engaging hole 51, and the lid member 60 is opened.

A pocket 71 is formed on the leg shield 45 on a right side in the vehicle width direction, and a switch 72 is arranged above the pocket 71. The pocket 71 opens upwardly, and also functions as a beverage holder.

The storage portion 50 includes: side walls 52 that extend approximately frontward in the longitudinal direction of the vehicle from the opening formed in the leg shield 45; and a deep end wall 53 that is formed so as to extend in the vertical direction on a deep end side of the side walls 52. The storage portion 50 exhibits, as a whole, a largely recessed shape indented toward a front side in the longitudinal direction of the vehicle from the opening formed in the leg shield 45. A power supply socket 54 for supplying electricity to external equipment is formed on an upper portion of the deep end wall 53 on an inner side in the vehicle width direction.

A storage box 66 is formed on the back surface 62 of the lid member 60. The storage box 66 opens upwardly. When a rider opens the lid member 60, the storage box 66 is pulled out from the storage portion 50 so that the rider can put an article into the storage box 66 or can take out an article from the storage box 66 from above.

Figure 5:
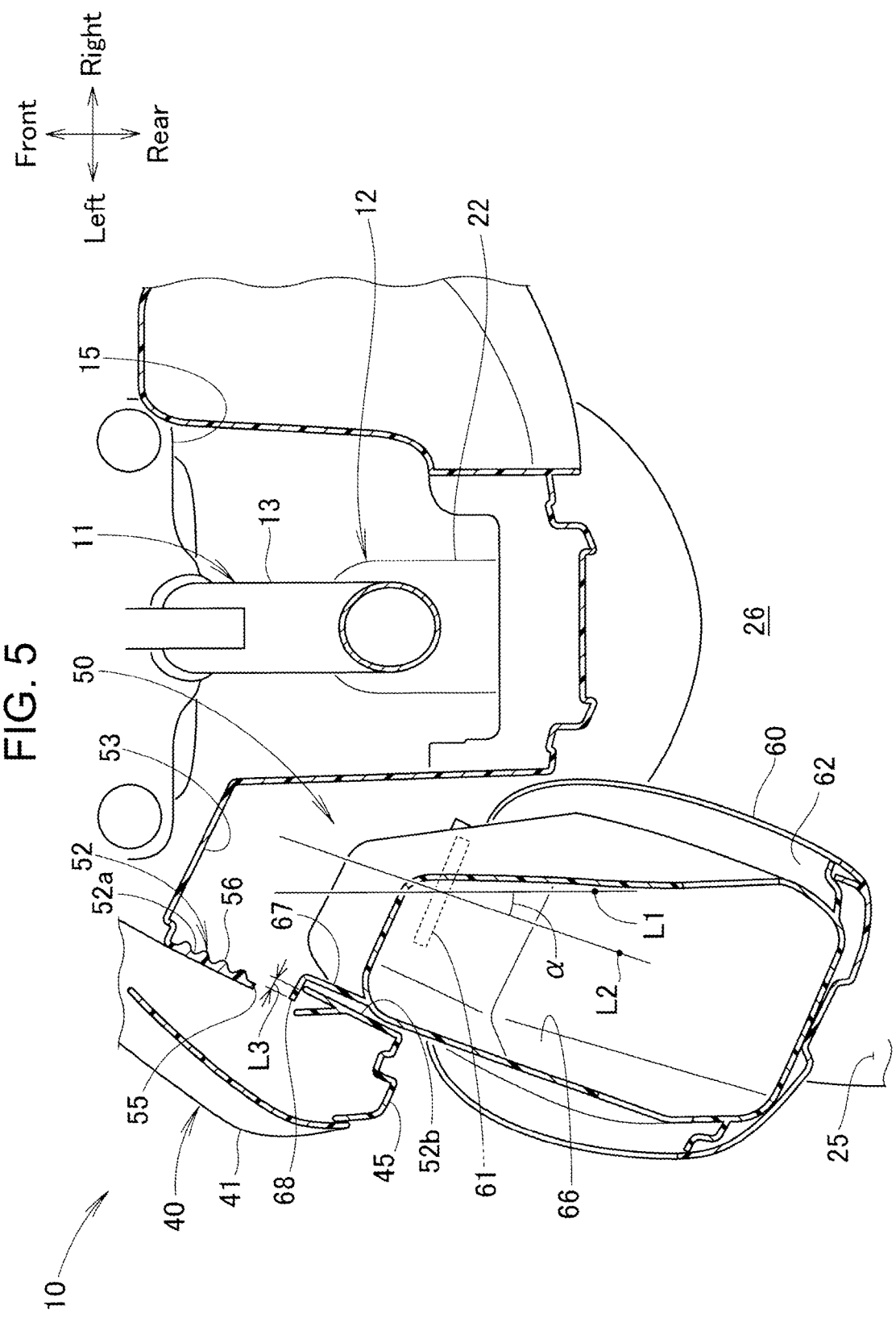
FIG. 5 is a cross-sectional view taken along a line 5-5 in FIG. 3.

As shown in FIG. 5, the hinge 61 of the lid member 60 has a predetermined length in the axial direction. As viewed in a plan view, an axis of the hinge 61 is arranged obliquely such that an outer side of the axis of the hinge 61 in the vehicle width direction is positioned more on a front side in a longitudinal direction of the vehicle than the center of the axis of the hinge 61 in the vehicle width direction. An angle, which a line L2 extending in the direction along which the lid member 60 is opened makes with respect to a line L1, which extends in the longitudinal direction of the vehicle is set to α. The line L2, which extends in the direction along which the lid member 60 is opened, is inclined toward a rear side in the longitudinal direction of the vehicle as well as toward the outside in the vehicle width direction. That is, the direction along which the lid member 60 is opened is the direction directed rearward and outward in the vehicle width direction.

Accordingly, as shown in FIG. 3, when the lid member 60 is opened rearward in the longitudinal direction of the vehicle and outward in the vehicle width direction, the power supply socket 54 is observable by a naked eye as viewed from a rear side in the longitudinal direction of the vehicle. There is nothing which blocks the rider's viewing of the power supply socket 54 behind the power supply socket 54 in the longitudinal direction of the vehicle and hence, a rider can easily perform an operation at the time of using the power supply socket 54.

As shown in FIG. 5, a stopper hole 55, which opens in the vehicle width direction, is formed in the side wall 52 of the storage portion 50 disposed on an outer side in the vehicle width direction. A corrugated portion 56 where crest shapes and valley shapes are continuously formed in the longitudinal direction of the vehicle is formed on the side wall 52 at a position more on a front side of the vehicle than the stopper hole 55.

The side wall 52 disposed on an outer side in the vehicle width direction is formed parallel to the line L2, which extends in the direction along which the lid member 60 is opened. In the direction perpendicular to the line L2, a side wall 52a that forms a front portion of the side wall 52 in the longitudinal direction of the vehicle and on which the corrugated portion 56 is formed is positioned more on an outside than a side wall 52b that forms a portion of the stopper hole 55 on a rear side in the longitudinal direction of the vehicle by a distance L3.

With respect to the storage box 66, a projecting portion 67, which extends frontward in the longitudinal direction of the vehicle, is formed on an outer side of the storage box 66. An engaging portion 68, which makes the storage box 66 engage with the storage portion 50, is formed on a distal end portion of the projecting portion 67 such that the engaging portion 68 extends outward in the vehicle width direction. In a state where the lid member 60 is closed, the engaging portion 68 is brought into contact with the side wall 52a, which forms the front portion of the side wall 52 in the longitudinal direction of the vehicle. The projecting portion 67 has elasticity and hence, the engaging portion 68 is biased to the side wall 52. Accordingly, when the lid member 60 is opened, the engaging portion 68 is brought into slide contact with the corrugated portion 56, and the engaging portion 68 is engaged with the stopper hole 55 so that the opening of the lid member 60 is restricted.

An outer end of the engaging portion 68 in the vehicle width direction is positioned slightly more on the inside than an edge of the side wall 52a on a front side in the longitudinal direction of the vehicle. Accordingly, at the time of closing the lid member 60, the engaging portion 68 can smoothly move over to the side wall 52a on a front side in the longitudinal direction of the vehicle from the stopper hole 55.

Figure 6:
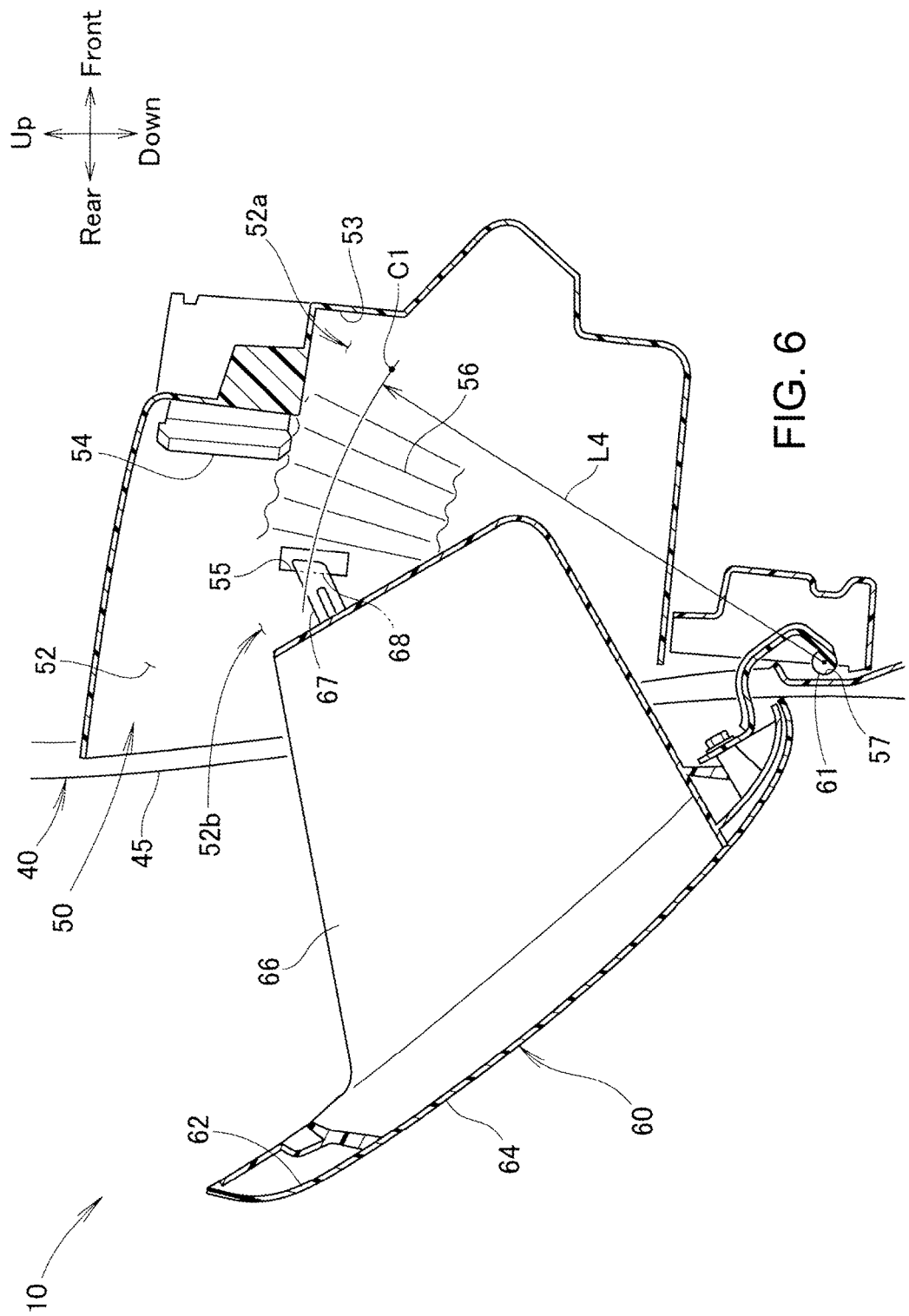
FIG. 6 is a cross-sectional view taken along a line 6-6 in FIG. 3.

As shown in FIG. 6, bearings 57 that receive a shaft of the hinge 61 are formed on portions of the storage portion 50 below the opening. A distance from the axis of the hinge 61 to the center of the engaging portion 68 is set to L4. At the time of opening or closing the lid member 60, the engaging portion 68 moves on a trajectory C1 formed in an arc shape having the distance L4 about the axis of the hinge 61. The stopper hole 55 and the corrugated portion 56 are arranged on and along the trajectory C1 formed in an arc shape. Accordingly, at the time of opening or closing the lid member 60, it is possible to make the engaging portion 68 move smoothly.

When the lid member 60 is opened, the engaging portion 68 is engaged with the stopper hole 55 and hence, the opening of the lid member 60 is restricted. As a result, it becomes possible to prevent an article from falling out from the storage box 66 when the lid member 60 is opened. Further, the corrugated portion 56 has the function of ribs. Accordingly, by forming the corrugated portion 56 in the vicinity of the stopper hole 55, the corrugated portion 56 compensates for the lowering of the rigidity of the side wall 52 caused by the formation of a hole in the side wall 52 and hence, the rigidity of the side wall 52 can be enhanced.

Next, the manner of operation and advantageous effects of the above-explained scooter-type vehicle 10 are explained.

As shown in FIG. 7A, the lid member 60 is in a closed state. The axis of the hinge 61 of the lid member 60 is arranged such that, as viewed in a plan view, an outer side in the vehicle width direction of the axis of the hinge 61 is positioned more on a front side in a longitudinal direction of the vehicle than the center side of the axis of the hinge 61 in the vehicle width direction. An inclination angle of the line L2, which extends in the direction along which the lid member 60, is opened with respect to the line L1, which extends in the longitudinal direction of the vehicle is an angle α.

As shown in FIG. 7B, the lid member 60 is in an open state. The lid member 60 is opened obliquely toward a rear side in the longitudinal direction of the vehicle and toward the outside in the vehicle width direction and hence, the foot rest space portion 26 positioned behind the storage portion 50 can ensure a space. There is no obstacle behind the storage portion 50 in the longitudinal direction of the vehicle and hence, a rider can easily put his hand into the storage portion 50 or pull his hand out of the storage portion 50 so that the usability of the storage portion 50 can be enhanced.

Next, the manner of operation and advantageous effects of the engaging portion 68 and the corrugated portion 56 are explained.

Figure 8A:
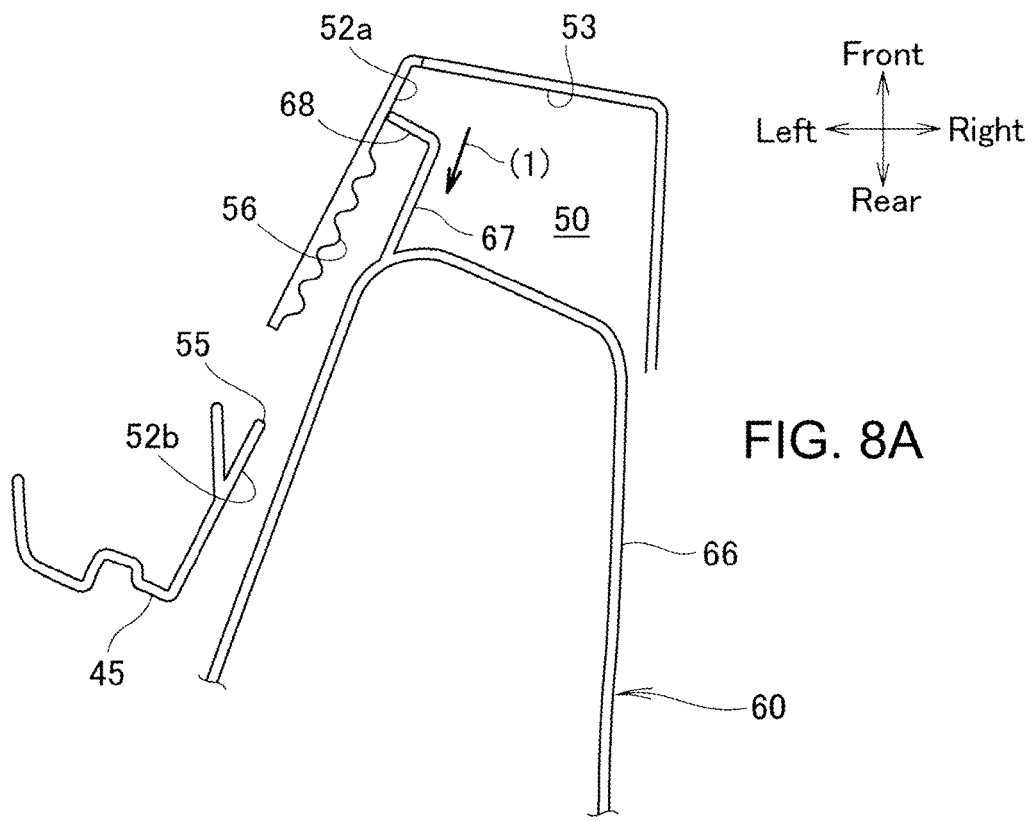
FIGS. 8A and 8B are operational views of an engaging portion and a corrugated portion.

As shown in FIG. 8A, when the lid member 60 is opened, along with the movement of the storage box 66 toward a rear side in the longitudinal direction of the vehicle, the projecting portion 67 and the engaging portion 68 move on the side wall 52a on a front side in the longitudinal direction of the vehicle as indicated by an arrow (1).

Figure 8B:
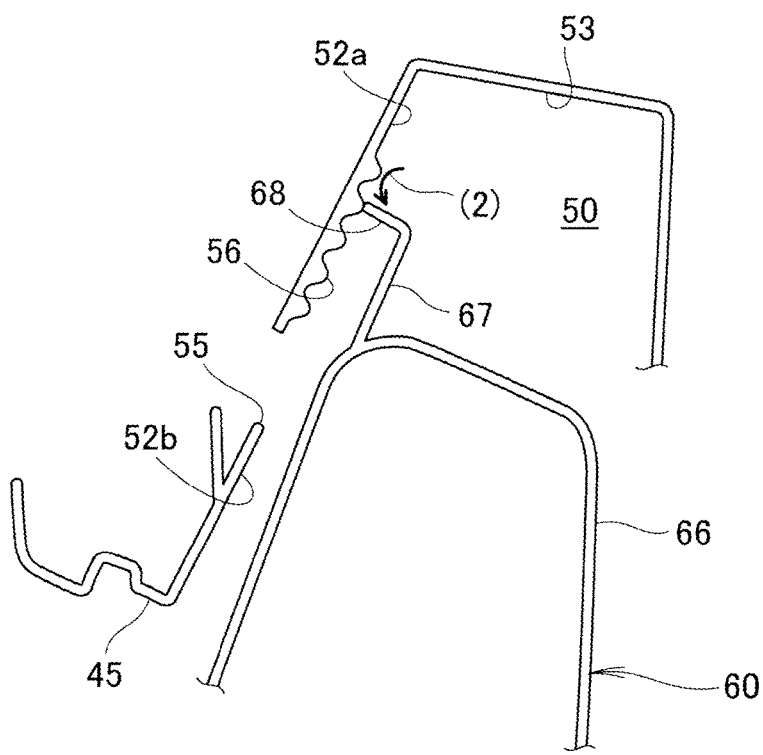

As shown in FIG. 8B, the projecting portion 67 has elasticity and hence, the engaging portion 68 is brought into slide contact with the corrugated portion 56 as indicated by an arrow (2). Accordingly, resistance is generated when the lid member 60 is opened and hence, sudden opening of the lid member 60 can be prevented whereby the lid member 60 can be opened or closed smoothly.

In the embodiment of the invention, the projecting portion 67 has elasticity, and the engaging portion 68 is biased to the side wall 52 by an elastic force of the projecting portion 67. However, the invention is not limited to the above, and there is no problem in biasing the engaging portion 68 to the side wall 52 by making use of an elastic member. In the embodiment, the storage portion 50 is disposed on a left side of the vehicle. However, the invention is not limited to the above, and the storage portion 50 may be disposed on a right side of the vehicle. Further, there is no problem in disposing the storage portion 50 on both sides of the vehicle.

The storage portion and the lid member of the present invention are preferably applicable to a scooter-type vehicle.

DESCRIPTION OF REFERENCE NUMERALS AND SIGNS

10: scooter-type vehicle (vehicle), 17: front wheel, 21: handle bar, 24: seat, 25: flat floor, 45: leg shield, 50: storage portion, 52: side wall, 53: deep end wall, 54: power supply socket, 55: stopper hole, 56: corrugated portion, 60: lid member, 61: hinge, 62: back surface, 66: storage box, 67: projecting portion, 68: engaging portion

What is claimed is:

1. A scooter-type vehicle comprising: a handle bar for steering a front wheel; a seat that is disposed behind the handle bar and on which an occupant is seated; a flat floor that is disposed between the seat and the handle bar and on which feet of the occupant are placed; a leg shield that is mounted on a front portion of the flat floor and extends upward; and a storage portion that is formed on the leg shield on a seat side and stores an article therein, wherein
the storage portion is formed so as to open in the leg shield, and is covered by a lid member,
the lid member is configured such that a storage box, which opens upwardly, is formed on a back surface thereof, the lid member being openably and closably mounted on a lower portion of an opening of the storage portion via a hinge,
an axis of the hinge is obliquely arranged such that, as viewed in a plan view, an outer side of the axis of the hinge in the vehicle width direction is positioned more on a front side in a longitudinal direction of the vehicle than a center side of the axis of the hinge in the vehicle width direction.

2. The scooter-type vehicle according to claim 1, wherein the storage portion includes: a deep end wall that is formed so as to extend in the vertical direction on a deep end side of an opening formed in the leg shield; and a power supply socket that is disposed at an upper portion of the deep end wall on an inner side in the vehicle width direction and supplies electricity, and
the power supply socket is arranged so as to be observable by a naked eye from a rear side in the longitudinal direction of the vehicle when the lid member is opened.

3. The scooter-type vehicle according to claim 1, wherein the storage box includes: a projecting portion that is disposed outside the storage box and extends frontwardly in the longitudinal direction of the vehicle; and an engaging portion that is formed on a distal end portion of the projecting portion, and makes the storage box engage with the storage portion,
the storage portion has a side wall that extends frontwardly in the longitudinal direction of the vehicle from the opening formed in the leg shield and in which a stopper hole is formed, and
the engaging portion is engaged with the stopper hole when the lid member is opened.

4. The scooter-type vehicle according to claim 2, wherein the storage box includes: a projecting portion that is disposed outside the storage box and extends frontwardly in the longitudinal direction of the vehicle; and an engaging portion that is formed on a distal end portion of the projecting portion, and makes the storage box engage with the storage portion,
the storage portion has a side wall that extends frontwardly in the longitudinal direction of the vehicle from the opening formed in the leg shield and in which a stopper hole is formed, and
the engaging portion is engaged with the stopper hole when the lid member is opened.

5. The scooter-type vehicle according to claim 3, wherein a corrugated portion where a crest shape and a valley shape are continuously formed in the longitudinal direction of the vehicle is formed on the side wall, and
the engaging portion is brought into slide contact with the corrugated portion when the lid member is opened or closed.

6. The scooter-type vehicle according to claim 4, wherein a corrugated portion where a crest shape and a valley shape are continuously formed in the longitudinal direction of the vehicle is formed on the side wall, and
the engaging portion is brought into slide contact with the corrugated portion when the lid member is opened or closed.

* * * * *